March 17, 1970  F. O. BOHN  3,500,684
BOREHOLE LOGGING APPARATUS AND METHOD
Filed Jan. 4, 1968  2 Sheets-Sheet 1

INVENTOR
FLOYD O. BOHN
BY Douglas M. Clarkson
ATTORNEY

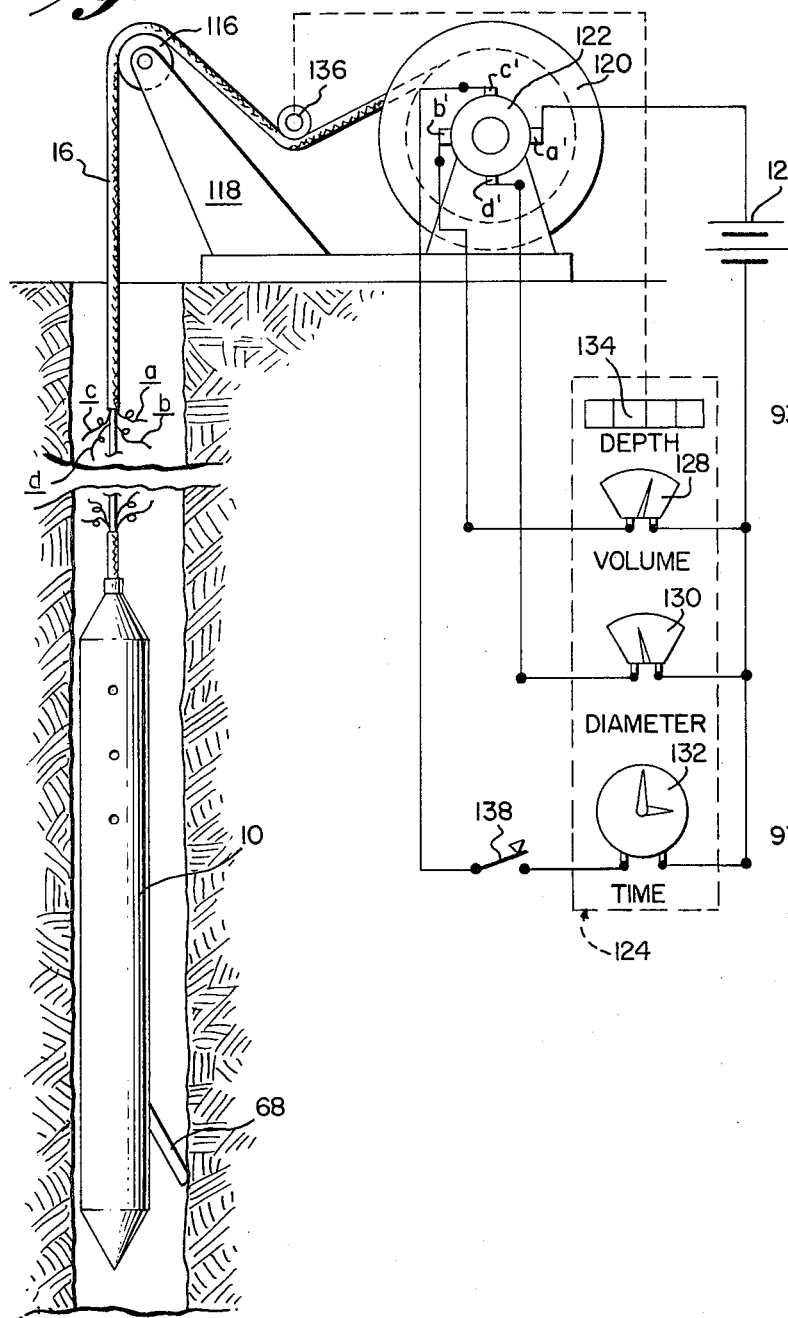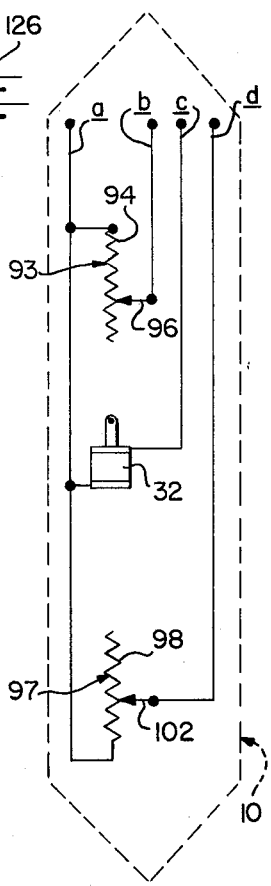
Fig. 2.
Fig. 3.
INVENTOR
FLOYD O. BOHN
BY Douglas M. Clarkson
ATTORNEY

United States Patent Office 3,500,684
Patented Mar. 17, 1970

3,500,684
BOREHOLE LOGGING APPARATUS AND METHOD
Floyd O. Bohn, Houston, Tex., assignor to Dresser Industries, Inc., Dallas, Tex., a corporation of Delaware
Filed Jan. 4, 1968, Ser. No. 695,640
Int. Cl. E21b 49/00, 33/12
U.S. Cl. 73—152       3 Claims

ABSTRACT OF THE DISCLOSURE

This disclosure relates to borehole logging apparatus and to a method to provide a log of relative permeability of formations traversed by the borehole. The apparatus includes means by which a selected test fluid is injected into the formation, and sensing circuitry indicates the volume of fluid accepted by the formation during a determinate time interval. Also, the apparatus measures the diameter of the borehole at the point of the test.

BACKGROUND OF THE INVENTION

This invention, generally, relates to borehole logging apparatus, and more particularly, it concerns an apparatus and method by which the relative permeability of sub-surface formations can be determined, together with the diameter of the borehole at the point of testing.

Many types of electrical and radioactive borehole logging devices are available for determining various characteristics of sub-surface formations by lowering a sensing unit into the borehole on an electrically conductive cable so that signals corresponding to the sensed characteristic are transmitted to the surface for recording and analysis. Permeability of sub-surface formations has been measurable in the past, however, only by the use of more elaborate production tests which involve the use of formation testers run into the borehole on tubing or drill pipe or by installing well casing and making actual well completion through casing perforations.

The use of formation testers is not only costly because of the large amount of drill pipe or tubing that must be handled but also is often unsatisfactory due to the difficulty in obtaining a satisfactory seal between expansible packers used in such tests and the relatively uneven open borehole. The costs of placing casing, including cementing and perforating for completion, are obviously high, and such procedures are employed only where highly conclusive evidence of commercial productivity is available.

Accordingly, the objects of the present invention include the provision of a novel method for obtaining a relative permeability log in a borehole and the provision of a novel tool which can be lowered into a borehole with conventional means to provide a measurement of formation permeability.

Another object of the present invention is to provide a borehole logging tool of the type referred to which also develops a measurement of borehole diameter.

Still another object of the present invention is to provide a borehole logging tool of the type referred to which is relatively simple in construction, compact, and readily adapted for use with ancillary handling equipment.

SUMMARY OF THE INVENTION

In accordance with the present invention, measurements of relative permeability of sub-surface formations are made with a tool adapted to be lowered into a borehole on the type of electrically conductive cable that is used conventionally in borehole logging. Briefly, the tool includes an elongated housing capable of carrying a selected fluid compatible with the particular formations to be tested, such as brine, diesel oil or other fluids, together with means for pressurizing the fluid to a controlled and uniform pressure above the hydrostatic pressures existing in the borehole. At a predetermined location in the borehole, the fluid is forced through a hinged nozzle, the nozzle being movable outwardly into forceful contact with the side of the borehole and, thus, against the formation ot be tested.

The tool is controlled from the surface by electrical power and includes sensing circuits which measure the amount of fluid injected into the formation through the nozzle over a determinate time interval. Since the acceptance of the fluid under the controlled pressure is proportional to the permeability of the sub-surface formation, the data provided will be indicative of such permeability. Also, the extent to which the hinged nozzle projects from the housing is sensed to provide a measurement of the diameter of the borehole at the point of testing.

With these and other objects in view, the nature of which will become more apparent, the invention will be more fully understood by reference to the drawings, the accompanying detailed description, and the appended claims.

BRIEF DESCRIPTION OF THE DRAWINGS

FIG. 2 is a schematic view depicting the logging tool of this invention in use, together with a circuit diagram of certain electrical read-out components; and FIG. 3 is a schematic circuit diagram of the electrical components contained in a presently preferred form of the tool.

BRIEF DESCRIPTION OF THE PREFERRED EMBODIMENT

Figure 1:
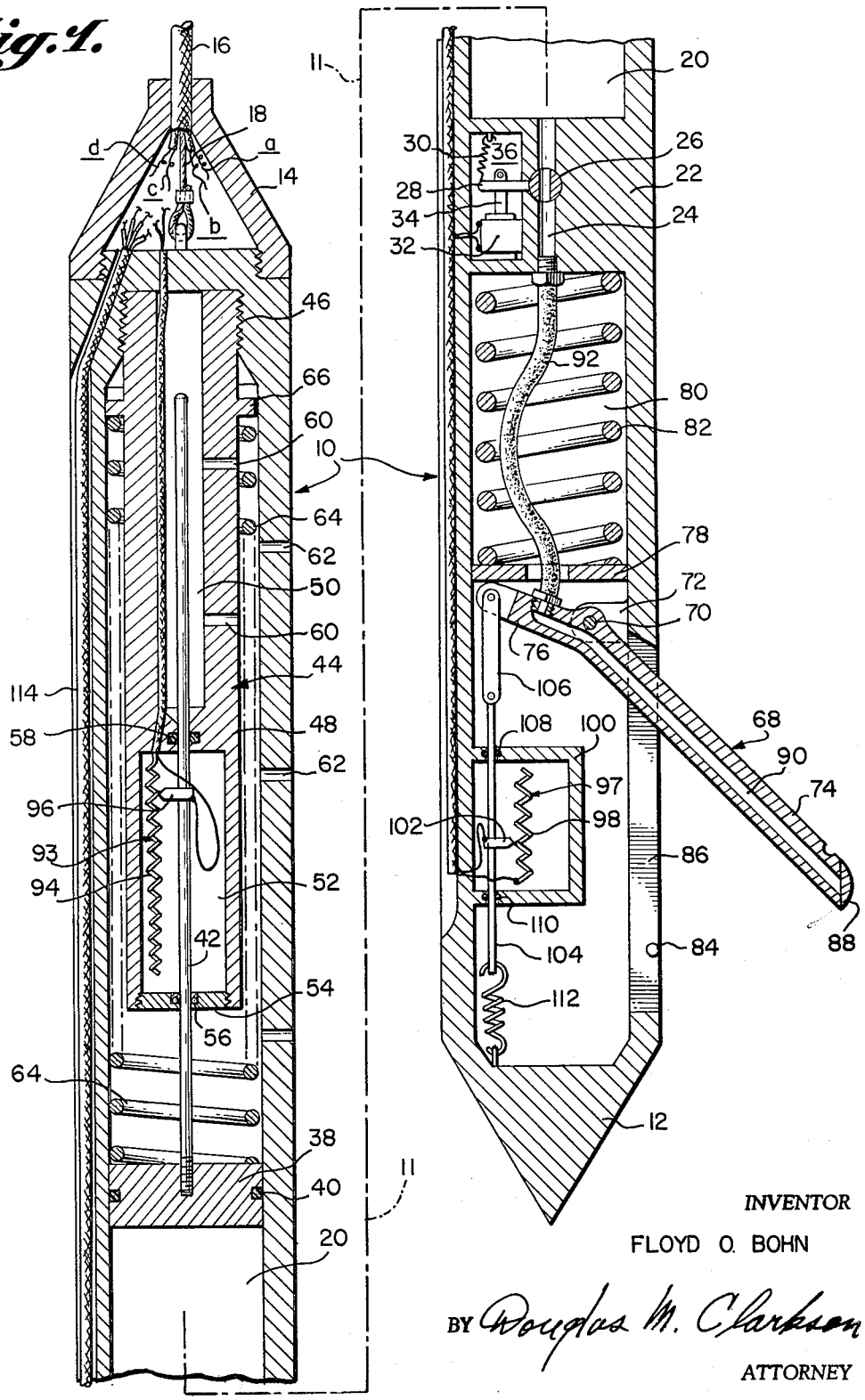
FIG. 1 is a fragmented longitudinal cross-sectional view of a logging tool constructed in accordance with the principles of the invention, shown in sections placed side-by-side but connected by a common center line.

Referring first to FIG. 1 of the drawings, the logging tool of this invention includes an elongated outer housing designated generally by the reference numeral 10, drawn in two sections but connected by a common center line 11. The housing 10 has a pointed shoe 12 at its lower end and a coupling head 14 at its upper end. The coupling head 14 includes means for connection to a multi-conductor hoist cable 16.

The hoist cable is well known in the art and may include, for example, a central steel cable 18 for mechanical strength together with four or more insulated electrical conductors a, b, c and d, all encased in a common outer sheath. Also, the head 14 may house appropriate terminal blocks (not shown) for connection of the leads a–d to appropriate leads for electrical components contained within the housing 10 in a manner to be described in more detail below.

The interior of the housing 10 is shaped to establish a centrally disposed cylindrical chamber 20 extending upwardly from a transverse wall 22, which has a bore 24 forming a fluid passageway. A rotatable valve 26 is disposed in the bore 24 and provided with an actuating arm 28 connected to a tension spring 30 to bias the valve toward a closed position to prevent fluid flow through the bore 24.

A solenoid 32 having a plunger 34 is connected to the arm 28 in such a manner that when the solenoid 32 is energized, the valve 26 will be moved to its open position, as shown in FIG. 1 of the drawings. Also it will be noted that the solenoid and valve actuating linkage is contained in a sealed chamber 36 provided in the wall 22 to isolate the solenoid and valve actuating linkage from borehole fluids.

The upper end of the chamber 20 receives a slidable piston 38 having an appropriate fluid seal 40 between the piston 38 and the walls of the chamber 20. An elongated piston rod 42 is threadably received in the upper surface of the piston 38 and extends upwardly into an interior body 44 suitably secured concentrically within the outer housing 10 by threads 46 at the upper end.

The interior body 44 is divided by an intermediate wall 48 into an upper chamber 50 and a lower sealed chamber 52. The lower chamber 52 is closed at its lower end by a threaded disc 54 having a central aperture to receive the rod 42 slidably. An O-ring seal 56 is received in the disc aperture to establish a fluid type seal between the disc 54 and the piston rod 42. Also, an O-ring seal 58 is located in the wall 48 to effect a fluid seal between the piston rod 42 and the wall 48 at the upper end of the lower chamber 52.

The upper chamber 50 serves to afford free movement of the piston rod 42 and is exposed to the hydrostatic pressure of borehole fluids through holes 60 through the walls of the interior body 44. Also, the outer housing or body is provided with apertures 62 to permit borehole fluid to enter the housing 10 above the piston 38.

The chamber 20 is adapted to receive a selected test fluid which is compatible with the formation under observation to the extent that such fluid may be injected into the formation. Brine, diesel oil or other suitable fluids may be used for this purpose, depending upon the nature of the formation to be tested.

In accordance with the present invention, the fluid in the chamber 20 is placed under uniform pressure in excess of hydostatic borehole fluid pressure by a constant force applying means. In the embodiment shown, the force applying means is a helical compression spring 64 extending between an annular flange 66 on the interior body 44 and the upper surface of the piston 38.

It is contemplated, however, that other suitable force applying means such as a hydraulic motor or the like might be used in place of the compression spring 64. The fluid in the chamber 20 will be placed under pressure initially after loading by the spring 64, assuming that the valve 26 is in its closed position under the influence of the tension spring 30, and the solenoid 32 is de-energized.

As shown in FIG. 1, a hinged nozzle 68 is supported pivotally by a pin 70 carried interiorly of the housing 10 by bracket 72. The nozzle 68 is supported at a point intermediate its ends to establish a relatively long lower arm 74 and a relatively short upper arm 76. The upper arm 76 is engaged by an apertured disc 78 slidably received in a lower chamber 80 in the housing 10 and biased downwardly under a uniform force by a second helical compression spring 82.

Here again, the spring 82 is used to provide a uniform biasing force by which the nozzle 68 is urged outwardly into the position shown in FIG. 1, although it will be appreciated that other suitable force supplying means may be used in place of the spring 82. Also, the nozzle 68 is held against the biasing effect of the spring 82 initially by an explosive latch 84 positioned within a slot 86 in the housing 10, the slot 86 being of a sufficient length to receive the entre lower arm 74 of the nozzle.

The nozzle carries an apertured plow and seal pad 88 on its outermost end and is formed with a fluid passageway 90 opening externally through the seal pad 88. The innermost end of the passageway 90 is in communication with the bore 24, and thus with the lower end of the chamber 20, by means of a flexible conduit 92. Thus, it will be appreciated that with the valve 26 in its open position, the selected test fluid in the chamber 20 will be permitted to flow through the bore 24, the flexible conduit 92, through the passageway 90 in the nozzle 68, and out through the apertured seal pad 88.

To sense the volume of fluid passing from the chamber 20 outwardly through the seal pad 88, a first potentiometer 93 having a resistance element 94 fixed relatively to the interior body 44 is supported in the lower chamber 52. A movable contact element 96 of the potentiometer 93 is mounted on the piston rod 42 for movement with the piston 38 as test fluid is expelled from the chamber 20. Thus, the difference in voltage drop across the potentiometer with corresponding movements of the piston 38 will provide a measurement of the volume of fluid expelled for a given displacement of the piston.

A second potentiometer 97 having a resistance element 98 is contained within a sealed housing 100 at the lower end of the tool. A movable contact element 102, is supported by a rod 104 connected by suitable linkage 106 to the inner end of the relatively short arm 76 of the nozzle 68. O-ring seals 108 and 110 insure isolation of the second potentiometer 97 from borehole fluid.

Also, a tension spring 112 functions to bias the rod 104 in a direction so that rod movement corresponds directly to movement of the nozzle 68. Since the resistance of the second potentiometer 97 with in the sealed housing 100 will vary in accordance with the outward movement of the nozzle 68, the potential difference across this second potentiometer 97 will correspond to the diameter of the borehole at the point of testing.

One suitable manner for connecting the first and second potentiometers 93 and 97, as well as the solenoid 32, to surface apparatus is depicted in FIGS. 2 and 3 of the drawings. The lead $a$ is connected to the resistance element 94 of the first potentiometer 93, one side of the coil of the solenoid 32 and to one end of the resistance element 98 of the second potentiometer 97 as shown. The slidable contact element 96 of the first potentiometer 93 is connected to the lead $b$ whereas the other side of the solenoid 32 is connected to the lead $c$, and the slidable contact 102 of the second potentiometer 97 is connected to the lead $d$.

The interconnection of the potentiometers 93 and 97 and the solenoid 32 to the leads $a$–$d$ within the housing 10 may be accomplished in any suitable manner, such as by a multi-conductor cable 114 (FIG. 1) packed within a groove extending longitudinally on the exterior of the housing 10 together with an appropriate terminal block in the head 14 as above mentioned. Also as above mentioned, the leads $a$–$d$ extend upwardly through the hoist cable 16 which, in accordance with conventional practice, is trained over a pulley 116 on the end of a boom 118 and connected to a winch 120 powered by suitable means (not shown) for raising or lowering the housing 10. Also in accordance with conventional practice, the winch 120 may be provided with a series of slip rings 122 connected electrically to the leads $a$–$d$ on the inner convolution of the cable wrapped on the winch 120.

Brushes $a'$, $b'$, $c'$ and $d'$ slidably engage respective ones of the slip rings 122 to establish an electrical connection between the leads $a$, $b$, $c$, and $d$ with surface equipment depicted by the reference numeral 124 in FIG. 2. The surface equipment 124 includes a source of electric current, such as a battery 126, one side of which is connected to the brush $a'$, whereas the other side of the battery 126 is connected, respectively, to one terminal of a volume galvanometer 128, a diameter galvanometer 130 and a timer 132.

A depth indicator 134 is coupled mechanically to an idler pulley 136 in engagement with the cable 16 to provide an indication of the distance the tool is lowered into the borehole. The other side of the volume galvanometer 128 is connected by way of the brush $b'$ to the lead $b$ and, thus, to the slidable contact 96 of the first potentiometer 93.

Similarly, the other side of the diameter galvanometer 130 is connected by way of the brush $d'$ to the lead $d$ and, thus, to the slidable contact 102 on the second potentiometer 97. The other terminal of the timer 132 is connected to one side of a control switch 138 and, then, to the brush c' for electrical connection with the lead c. Thus, it will be appreciated that the solenoid 32 will be energized by closure of the switch 138, and simultaneously, the timer 132 will be actuated.

Correspondingly, movement of the switch 138 to its open position will simultaneously de-energize both the solenoid 32 and the timer 132. The particular circuitry shown in FIGS. 2 and 3 is for purposes of illustration only and it will be apparent to those skilled in the art that other circuit arrangements may be employed to develop the indicating functions of the galvanometers 128 and 130, the timer 132 and the control function of the switch 138.

In operation, the chamber 20 in the body 10 is filled with a selected test fluid and put under pressure by the coil spring 64, in the disclosed embodiment. The valve 26 initially will be closed by de-energization of the solenoid 32. Also, the nozzle 68 will be held against the bias of the spring 82 within the slot 86 of the housing 10 by the explosive latch 84. It might be mentioned at this point that the explosive latch is a conventional item for use in subsurface equipment and may be of the type to be actuated either by an electrical signal from the surface or by an appropriate electrical device controlled from the surface.

The housing 10 is lowered into the borehole by the winch 120 to a point adjacent a formation for which permeability information is desired. When the tool reaches the desired depth, the explosive latch 84 is fired to release the nozzle 68 for movement outwardly against the wall of the borehole and into forceful contact with the formation. To insure firm contact of the plow and seal pad 88 with the formation, the weight of the body may be released by the winch to force the seal into further engagement with the side of the bore and thus against the formation. This operation is desirable in many instances particularly where the borehole is coated with mud cake as a result of the drilling operation.

When the tool has been positioned with the nozzle extending outwardly against the wall of the borehole, as shown for example in FIG. 2 of the drawings, the permeability of the formation is measured by closing the switch 138 to energize the solenoid 32 and open the valve 26. The test fluid in the chamber 20 then will flow through the bore 24, through the flexible conduit 92 and through the passageway 90 in the nozzle 68, out through the seal pad 88 and into the formation, assuming the formation to be of sufficient permeability to accept the test fluid.

When the timer 132 indicates the passage of a predetermined time interval, the switch 138 is opened to close the valve 26. The volume of fluid expelled into the formation, if any, is then read on the volume galvanometer 128, which is calibrated for this purpose. Also, the diameter of the borehole at the point of testing for permeability may be read directly off the diameter galvanometer 130 and recorded. The housing 10 then may be raised to a higher elevation without retraction of the nozzle 68, and the nozzle may be reset firmly against the wall of the borehole by allowing some slack in the cable 16. The test procedure described above then is repeated, and appropriate records are taken of the results.

Since the volume of test fluid injected into the formation during a particular time interval will correspond directly to the permeability of the formation, it will be seen that the reading taken on the galvanometer 128 can be related directly as a function of relative permeability, when the switch 138 is closed for the same duration during successive tests. In other words, a relative permeability log of the formation can be procured merely by correlating the readings on the depth meter 134 with the readings on the galvanometer 128 for successive tests, respectively. Also the switch 138 may be automated so that the valve 26 is open for a predetermined time interval during each test. The diameter of the borehole at the point of each test may be read directly from the galvanometer 130.

Thus, it will be appreciated that the present invention provides an extremely effective and readily manipulated apparatus for obtaining a profile of the relative permeability of sub-surface formations in a borehole, together with a profile of the borehole diameter at various depths. It will be appreciated further that various modifications in the apparatus and methods for its use, as disclosed herein, can be made by those skilled in the art.

The embodiments of the invention in which an exclusive property or privilege is claimed are defined as follows:

1. Apparatus for testing the permeability of a formation penetrated by a borehole, comprising:
   housing means adapted to be lowered into a borehole;
   fluid injection means carried by said housing for introducing a fluid into a formation exposed by said borehole, said fluid injection means including a nozzle member movable outwardly from said housing into engagement with said formation;
   means to expel said fluid through said nozzle member and into said formation;
   means to sense the volume of fluid injected through said nozzle member during a determinate time period; and
   means to sense the diameter of the borehole at the depth of said formation therein, said diameter sensing means including means to develop an output corresponding to the distance said nozzle moves out of said housing into engagement with said formation.

2. Apparatus for testing the permeability of a formation penetrated by a borehole, comprising:
   housing means adapted to be lowered into a borehole;
   fluid injection means carried by said housing for introducing a fluid into a formation exposed by said borehole, said fluid injection means including a nozzle member pivotally mounted on said housing movable outwardly from said housing into engagement with said formation;
   means for moving said nozzle member into forceful contact with said formation;
   means to expel said fluid through said nozzle member and into said formation; and
   means to sense the volume of fluid injected through said nozzle member during a determinate time period.

3. The apparatus recited in claim 2, in which said nozzle member has an iner end an an outer end on opposite sides of said pivotal mount, and in which said means for moving said nozzle member includes spring means acting against the inner end of said nozzle member to bias the outer end in an outward direction, and including releasable latch means for retaining said nozzle member in a retracted position.

References Cited

UNITED STATES PATENTS

| | | | |
|---|---|---|---|
| 981,152 | 1/1911 | Arndt | 73—115 |
| 2,725,282 | 11/1955 | Buckley et al. | 73—152 |
| 2,747,401 | 5/1956 | Doll | 73—151 |
| 2,815,578 | 12/1957 | Broussard | 73—151 |
| 3,035,440 | 5/1962 | Reed | 73—38 |

JERRY W. MYRACLE, Primary Examiner

U.S. Cl. X.R.

166—100